Oct. 16, 1956   W. T. WAGNER   2,766,499
BELT CONNECTOR
Filed May 10, 1952

INVENTOR.
W. T. WAGNER
BY
ATT'Y.

United States Patent Office 2,766,499
Patented Oct. 16, 1956

2,766,499

BELT CONNECTOR

William Thomas Wagner, Dayton, Ohio, assignor to The Dayton Rubber Company, a corporation of Ohio Application May 10, 1952, Serial No. 287,192

5 Claims. (Cl. 24—31)

This invention relates to a novel and improved means for interconnecting the ends of belts and, more particularly, to a flexible, inextensible, belt link which may be easily and inexpensively produced and which, because of the novel principle employed in its construction, may be depended upon to give excellent, trouble-free service.

In many of the various applications to which V-belts are put nowadays, and particularly in the application of these belts to power driven equipment on railway cars, it is necessary to be able to separate or disjoint the belts so that they may be placed over or removed from the pulleys which they drive. Many of the connectors previously devised for this purpose have been of a hinged construction to provide the flexibility which is necessary in order to enable the connector to pass around the pulleys being driven by the belt. By thus providing a hinge which will enable the connector to flex when the belt passes around a pulley, the flexural load is taken off the belt at the point at which the fastener is riveted or otherwise fastened to the belt ends. Hence, the strain on the rivets or other means for fastening the connector to the belt ends is very greatly reduced. However, the hinge, just as in the case of a bearing, is subject to wear, lubrication difficulties, abrasive action due to grit and dirt entering the joint, etc. The existing problem, therefore, in the case of belt connectors, has been that of devising a belt link which is highly flexible, has no moving parts, and is totally enclosed or sealed against the entry of dirt or moisture so as to protect the link against abrasion or corrosion.

Accordingly, it is an object of the present invention to provide a new and improved form of belt link which overcomes the problem of wear experienced with previous types of belt fasteners.

Another object of the invention is to provide a flexible link, for connecting the ends of a belt, which contains no moving parts and which is embedded in a body of resilient material that permits flexing of the link and protects it against abrasion and corrosion.

Another object is to provide a flexible belt link comprising a pair of spaced pins about which is wrapped a flexible, tension element so as to provide a transverse axis of flexure lying intermediate the pins.

Another object is to provide a flexible belt connector which is comprised of clamping members secured to the opposite ends of the belt and a flexible link connecting the clamping members, said link comprised of a pair of spaced sleeves about which is wrapped a flexible, tension element so as to provide a transverse axis of flexure located intermediate the sleeves, the sleeves and tension element being embedded in a body of resilient material which holds the element in place on the sleeves and protects it from corrosion and abrasion.

With these and other objects in view which will become apparent from the following description, the invention includes certain novel features of construction and combinations of parts, the essential elements of which are set forth in the appended claims and a preferred form or embodiment of which will hereinafter be described with reference to the drawings which accompany and form a part of this specification.

Figure 1:
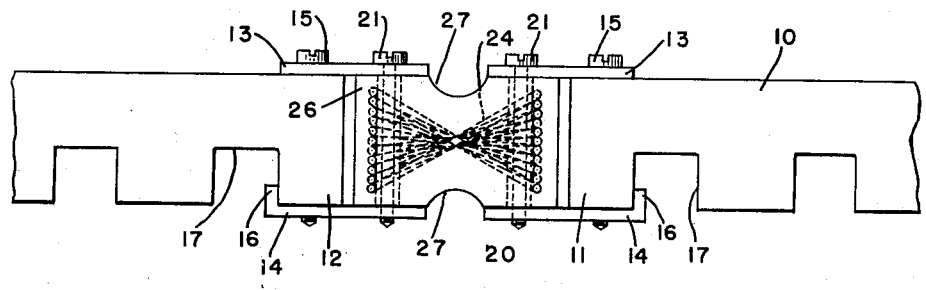
Fig. 1 is a side elevation of my novel belt connector.

My novel means for separably connecting the ends of a belt is particularly suited to a belt having considerable thickness, or depth, such as a V-belt. Accordingly, there is shown in Fig. 1, a V-belt 10, the ends 11 and 12 of which are shown connected together by my improved type of belt connector to form a continuous, endless belt. As herein shown, the belt connector includes, in the case of each belt end 11 and 12, a pair of clamping members, including an upper plate 13 and a lower plate 14, which plates may be secured by a screw 15, or other suitable means such as a rivet, to the end of the belt 10. If the belt 10 is of the notched type as shown herein, the bottom plate 14 may be provided with an upturned lip 16 for engaging with the edge of notch 17 provided on the pulley side of the belt.

Figure 2:
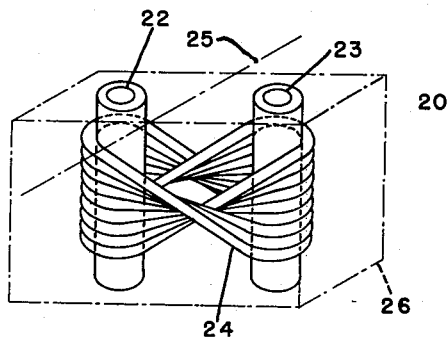
Fig. 2 is a perspective view of the flexible link incorporated in the connector shown in Fig. 1.

Secured between the two pairs of clamping members 13 and 14 mounted on the belt ends 11 and 12, is a flexible link 20 which is fastened at either end to the upper and lower plates 13 and 14 by suitable anchoring pins or screws 21. The screws or pins 21 pass through suitable holes provided in the plates 13 and 14 and through hollow pins or sleeves 22 and 23 (Fig. 2) which form a part of the structure of the flexible link 20. As best shown in Fig. 2, the spaced sleeves 22 and 23 are connected together by a flexible, tension element 24 which is wrapped about the sleeves 22 and 23 in the manner shown so as to provide a transverse axis of flexure 25, about which the sleeves may turn, located approximately midway between the sleeves. The element 24 is preferably made of a flexible material which is substantially inextensible such as flexible steel wire or steel wire cable. Tightly woven cord of textile materials such as cotton, rayon, or nylon may also be used where the high tensile strength of steel may not be required.

In order to provide the connection between the sleeves provided by the tension element 24 with a transverse flexural axis, the element 24 is wrapped about the sleeves 22 and 23 in the manner shown in Fig. 2. As therein shown, the element is started at the upper end of one sleeve and passed around the lower end of the other sleeve with each succeeding turn lying inwardly of and adjacent the preceding turn until, on the last turn, the element is wrapped around the lower end of the one sleeve and the upper end of the other sleeve so as to provide the fan-shaped arrangement shown in Fig. 2. It will be observed that, with this arrangement, the sleeves 22 and 23 may each be tilted so that their upper ends move apart and their lower ends approach one another with but very little resistance. This is the tilting action which is required of the sleeves when the belt passes over the pulleys, it then being necessary for the upper ends of the sleeves 22 and 23 to move apart while the bottom ends of the sleeves move toward one another. As a result of this manner of winding the tension element the respective turns are in parallel superimposed relationship around the sleeves 22 and 23 and overlap each other intersecting an axis intermediate the sleeves and normal to the longitudinal axis of the belt which is also the axis of rotation of the belt. The flexing action takes place about this intermediate axis.

In order to lend stability to the link 20 and to hold the turns of the tension element 24 in place on the sleeves 22 and 23, and for the further purpose of protecting the tension element and the sleeves from corrosion and abrasion, the sleeves and element are molded in a block of rubber or other suitable resilient material 26. If desired, concave or semi-circular notches 27 may be provided on the top and bottom faces of the link 20 midway between the ends thereof so as to insure that the resilient enclosure 26 will not interfere with the flexing of the link about the axis 25. This also avoids the presence of a sharp corner in the rubber or other flexible material portion at the point of flexure. The flexible material may be of a suitable flexible plastic composition such as polyvinyl cholride, natural or synthetic vulcanized rubber, etc. These may be molded about the connector in the manner well known in the art.

Having now described my invention in considerable detail, and having explained the manner in which it may be constructed and used, I wish it to be understood that the present disclosure is illustrative rather than restrictive, and that changes and modifications may be resorted to without departing from the spirit or scope of the claims appended hereto.

What I claim as new and useful and desire to secure by United States Letters Patent is:

1. A flexible link for joining together the ends of a belt, said link comprising a pair of upright, spaced sleeves, a flexible, tension element wrapped about said sleeves for connecting them together, said element being so wrapped about said sleeves that, in the case of one turn thereof, said element passes around the lower end of one sleeve and the upper end of the other pin, and, in the case of another turn thereof, said element passes around the upper end of said one sleeve and the lower end of said other sleeve, thereby forming a connection between said sleeves having a flexural axis lying midway between said sleeves and at right angles to the longitudinal axes thereof, and a body of flexible material molded around said sleeves and said tension element to hold said element in place on said sleeves and protect it from corrosion and abrasion.

2. A flexible link for joining together the ends of a belt, said link comprising a pair of upright, spaced sleeves, a flexible, tension element wrapped about said sleeves for connecting them together, said element being so wrapped about said sleeves that the first turn thereof passes around the lower end of one sleeve and the upper end of the other pin, and each succeeding turn thereof lies inwardly of and adjacent the preceding turn until, on the last turn, the element passes around the upper end of said one sleeve and the lower end of said other sleeve, to thereby form a connection between said sleeves having a flexural axis lying midway between said sleeves and at right angles to the longitudinal axes thereof, and a body of flexible material molded around said sleeves and said tension element so as to hold said element in place on said sleeves and protect it from corrosion and abrasion.

3. A belt connector comprising clamping members adapted to be secured to opposite ends of a belt, a flexible, inextensible link connecting said clamping members to join together the ends of the belt, said link including a pair of upright, spaced sleeves, a flexible, tension element wrapped about said sleeves for connecting the same together, said element being so wrapped about said sleeves that the first turn thereof passes around the lower end of one sleeve and the upper end of the other sleeve, and each succeeding turn thereof lies inwardly of and adjacent the preceding turn until, on the last turn, the element passes around the upper end of said one sleeve and the lower end of said other sleeve, to thereby form a connection between said sleeves having a flexural axis lying midway between the sleeves and at right angles to the longitudinal axes thereof, and a body of rubber composition molded around said sleeves and said tension element to hold said element in place on said sleeves and protect it from corrosion and abrasion, and anchor pins passing through said clamping members and said sleeves for fastening said link to the opposite ends of the belt.

4. A flexible link for joining together the ends of a belt, said link comprising a pair of parallel, spaced sleeves and a flexible tension element providing a transverse axis of flexure about which said sleeves may turn wrapped around said sleeves, said element starting at the upper end of one sleeve and passing around the lower end of the other sleeve with each succeeding turn thereof lying inwardly of and adjacent to the preceding turn until, on the last turn, the element is wrapped around the lower end of the one sleeve and the upper end of the other sleeve, said element being continuous such that the tension load is uniformly distributed to all of said turns thereof and means for holding said element in place.

5. A flexible link according to claim 4 wherein all of said turns intersect along a common axis lying approximately midway between said sleeves and at right angles to the longitudinal axes thereof.

References Cited in the file of this patent

UNITED STATES PATENTS

| | | |
|---|---|---|
| 1,511,396 | Champney et al. | Oct. 14, 1924 |
| 1,966,450 | Knox | July 17, 1934 |
| 2,050,899 | Shippert et al. | Aug. 11, 1936 |
| 2,295,029 | Cooney et al. | Sept. 8, 1942 |

FOREIGN PATENTS

| | | |
|---|---|---|
| 321,999 | Great Britain | Nov. 28, 1929 |
| 636,110 | Germany | Oct. 2, 1936 |